Sept. 18, 1934.   A. E. BARTZ   1,974,096
TRANSMISSION INTERLOCK
Filed April 21, 1932   2 Sheets-Sheet 1

Fig_1_

Sept. 18, 1934.  A. E. BARTZ  1,974,096
TRANSMISSION INTERLOCK
Filed April 21, 1932   2 Sheets-Sheet 2

INVENTOR:
Arthur E. Bartz
by Macleod, Calhoun, Copeland & Dike
Attys.

Patented Sept. 18, 1934

1,974,096

UNITED STATES PATENT OFFICE 1,974,096

TRANSMISSION INTERLOCK

Arthur E. Bartz, Detroit, Mich., assignor to Hudson Motor Car Company, Detroit, Mich., a corporation of Michigan Application April 21, 1932, Serial No. 606,628

2 Claims. (Cl. 74—107)

This invention relates to transmission mechanisms for motor vehicles, and more particularly to means for preventing the gears of the transmission, especially the intermediate and high speed gears, from becoming disengaged, accidentally, during the operation of the vehicle.

In certain motor vehicle transmissions of the self-synchronizing type with which free wheeling mechanism is sometimes associated, it is not always necessary to actuate or disengage the main clutch in order to shift from one of the forward speed positions to another position. Difficulty and annoyance have been encountered due to the tendency of the clutch elements, for operating the constantly enmeshed helical gears of the intermediate and high forward speed positions, becoming disengaged when the vehicle is in motion.

One of the objects of the present invention is, therefore, to provide a transmission mechanism in which the intermediate and high forward speed gears are normally locked in operative relation. Another, and more specific object of the invention is to provide means for releasing the locking means, which releasing means operates independently of the main clutch, and which is under the control of the operator through the medium of the throttle operating member, such, for example, as the accelerator pedal. Other objects and advantages of the invention will appear as the description proceeds.

Figure 1:
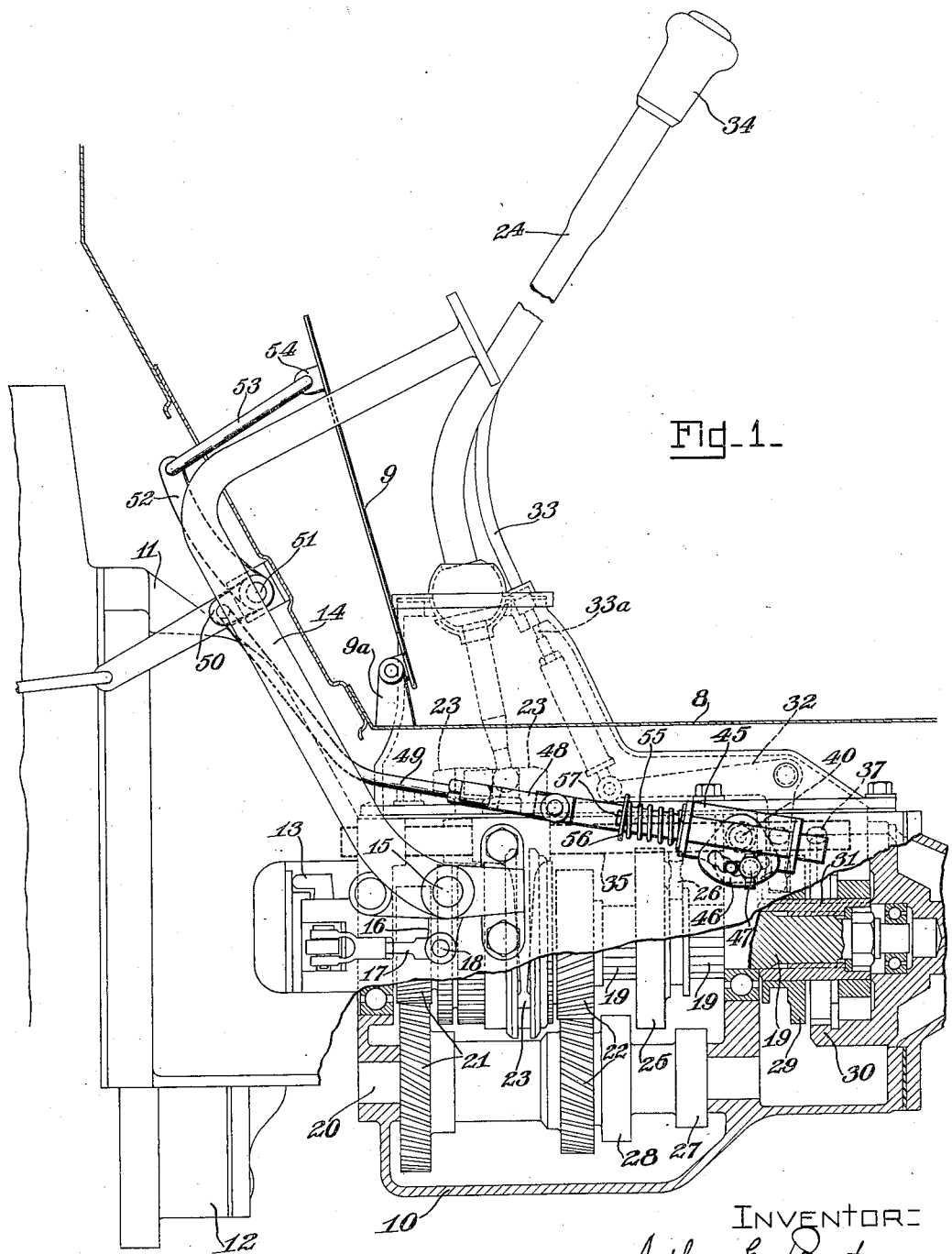
Fig. 1 is a side elevation partly broken away of the transmission mechanism of a motor vehicle embodying the invention.
Figure 2:
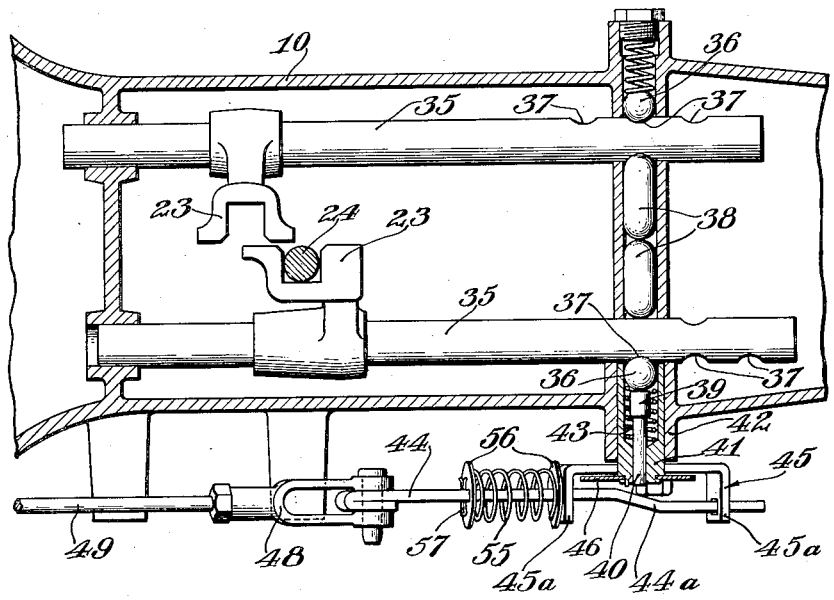
Fig. 2 is a plan view, partly in section, of certain of the parts shown in Fig. 1, with the locking mechanism released.
Figure 3:
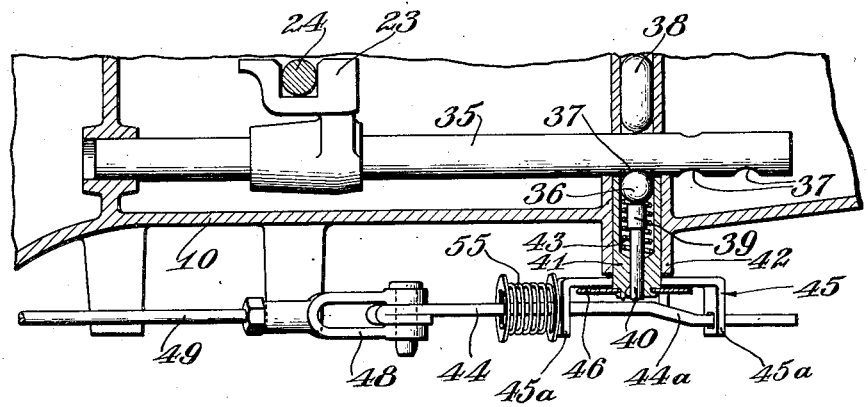
Fig. 3 is a fragmentary plan view, similar to Fig. 2, showing the locking mechanism in locked position.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings is shown a motor vehicle transmission and main clutch assembly including a transmission casing 10 and a clutch casing or housing 11 enclosing a main clutch 12 which is controlled, through a suitable fork 13, from the usual clutch pedal 14, pivoted on a stud 15 carried by a bracket secured to the side of the transmission casing 10, said pedal having an arm 16 connected by a link 17 with the clutch fork 13, said link being connected with said arm by a pivot pin 18.

The transmission mechanism, which is shown in the second or intermediate forward speed position, may be of any standard or suitable construction and arrangement, the particular type herein shown and described, merely by way of illustration, comprising variable speed gearing in which the helical gears of the second or intermediate and high forward speeds on the main shaft are in constant mesh with their corresponding gears on the countershaft, there being a free wheeling unit positioned at the rear of the transmission gearing and located within a compartment of the transmission casing. Any desired type of mechanism may be employed for changing the gearing speeds, there being shown suitable dog clutch mechanism for this purpose. The transmission mechanism forms no part of the present invention and is substantially like that disclosed in a copending application of Floyd J. Teed, Serial No. 607,256, filed April 25, 1932.

The transmission is provided with the usual two-part main transmission shaft comprising a splined driving section (not shown) and a splined driven section 19, journalled in suitable bearings in the transmission casing. The transmission also comprises the usual countershaft 20. Helical high speed gears and helical second speed gears, 21 and 22, respectively, which are in constant mesh, are mounted upon the driving section of the main shaft and the countershaft. A shifting fork 23 is provided for rendering operative either the second or high speed gearing, as desired, there being provided the usual shift lever 24 for operating the fork. A spur gear 25 is mountd upon the driven shaft section 19 and is adapted to be shifted by a fork 26 into engagement with either the reverse gears, one of which is indicated at 27, or the low speed gear 28. The free wheeling mechanism is positioned in a compartment behind the transmission gearing and comprises male and female clutch members 29 and 30, respectively. The member 29 is splined upon a sleeve 31, which sleeve is in turn splined to the driven shaft section 19. A bell crank lever 32, mounted upon a shaft journalled in the transmission casing 10, has an arm which is in engagement with the hub of the member 29. The bell crank 32 is actuated by means of a slidable knob or handle 34, mounted upon the end of the shift lever 24, through the medium of an inter-connecting flexible shaft 33a housed within a tube or conduit 33. By this mechanism the member 29 is shifted to engage or disengage the member 30 and couple or uncouple the free wheeling mechanism. This free wheeling mechanism and its controlling or shifting means is identical with that disclosed in the copending application of Stuart G. Baits, Serial No. 590,431, filed February 2, 1932, and since it forms no part of the present invention, it is not deemed necessary to describe it more in detail.

The gear shift lever 24 is engageable with the shifting forks 23 and 26 which, in turn, are carried by the usual shifter slides shown at 35.

The shifter slides 35 are yieldingly positioned in their central neutral positions, or in shifted positions, in opposite directions from the neutral positions by means of spring pressed positioning plungers or balls 36 which cooperate with notches 37 in the slides. Interlocking mechanism of well-known type, generally indicated at 38, is also preferably provided for locking one slide in neutral position when the other slide has been moved out of neutral position.

In accordance with the present invention, means are provided for positively locking one or more of the selectively shiftable driving or transmission elements or gears against shifting movement when the accelerator pedal 9 (Fig. 1) is depressed and for releasing the same so as to permit shifting thereof when the accelerator pedal is released, that is to say, when the pressure of the foot of the operator is removed from the pedal. In the particular embodiment of the invention shown, such locking means cooperate with the shifter slide 35 for operating the second and high speed forward gears and comprises a plunger 39 for cooperating with the spring pressed positioning ball 36 for said slide to hold the latter rigidly against its normal yielding movement and thereby prevent longitudinal movement of said slide except when the accelerator pedal is released. The plunger 39 is formed with a stem 40 guided in a sleeve or bushing 41 which is mounted in a boss 42. The sleeve receives the reaction of a spring 43 by which said ball is yieldingly pressed into operative position. At its outer end, the stem 40 is engaged and held in locking position by a link 44 having an offset portion 44a. The link 44 is guided for longitudinal movement at its rear end in openings formed in the parallel right angular end portions 45a of a guide bracket, shown as a whole at 45. The guide bracket is adjustably supported upon and secured to the transmission casing by means of a clamp or plate 46 which is held in position by a cap screw 47. The link 44 is connected at its forward end to a clevis 48 which in turn is connected with a curved rod 49 that extends forwardly and upwardly beneath the floor boards 8 and is connected at its forward end with an arm 50 rigidly mounted upon a rotatable shaft 51. The connection between the link 44 and the accelerator pedal 9 is completed through a lever 52 which is also rigidly mounted upon the shaft 51 and has its free end connected to a rod 53 which is pivotally mounted at 54 to the accelerator pedal. The lower end of the accelerator pedal 9 is pivotally mounted upon a bracket or support 9a mounted upon the floor boards 8. A coil spring 55 surrounds the link 44 throughout a portion of its length adjacent the front end of the supporting bracket 45, there being spaced plates 56 provided which serve as stops for the ends of the spring. The forward plate 56 is held against movement in a forward direction relative to the link by means of a pin 57. The tendency of the spring 55 is to force the link 44, clevis 48 and rod 49 forwardly to cause the shaft 51 to rotate in a clockwise direction to maintain or assist in maintaining the accelerator pedal in its released or inoperative position as shown in Fig. 1.

From the foregoing, it will be seen that I have provided positive means for locking the second or intermediate and the high speed gears in driving relation whenever the accelerator pedal is depressed. The locking means is automatically released when pressure is removed from the accelerator pedal. Thus it is possible to shift the gears of the transmission by simply releasing the accelerator pedal, without the necessity of actuating the main clutch.

It is to be understood that my invention is not intended to be limited to use in connection with the accelerator pedal but that it is possible to effect the locking and releasing by means of any suitable throttle-operating mechanism which controls the flow of fuel to the engine.

I claim:

1. In a motor vehicle, in combination, an accelerator pedal, a transmission including constantly intermeshing gears, clutch mechanism for rendering said intermeshing gears operative, a shifter slide for engaging and disengaging said clutch mechanism, a locking member for locking said shifter slide against relative movement, a free wheeling unit associated with said transmission, means for shifting said free wheeling unit into and out of operative relation with the transmission, and a link connected with said accelerator pedal and cooperating with said locking member to render the latter effective to lock the shifter slide and clutch mechanism when the accelerator pedal is depressed and ineffective when said pedal is released.

2. In a motor vehicle, in combination, an accelerator pedal, a transmission having coacting driving elements relatively movable into and out of driving relation, means for locking said elements in driving relation, a free wheeling unit associated with said transmission, means for shifting said free wheeling unit into and out of operative relation with the transmission, and shiftable means connected with said accelerator pedal and engageable with said locking means for rendering the locking means effective when said pedal is depressed and ineffective when said pedal is released.

ARTHUR E. BARTZ.